INVENTORS
THOMAS E. PELT
PHILLIP A. LeGARE
BY
Kelly O. Corley
ATTORNEY

United States Patent Office 3,530,286
Patented Sept. 22, 1970

3,530,286
INSTRUMENT FOR STATISTICAL COMPUTATIONS
Thomas E. Pelt and Phillip A. Legare, Pensacola, Fla., assignors to Monsanto Company, St. Louis, Mo., a corporation of Delaware
Continuation of application Ser. No. 739,908, June 14, 1968, which is a continuation of application Ser. No. 402,192, Oct. 7, 1964. This application Dec. 16, 1968, Ser. No. 785,446
Int. Cl. G06g 7/00; G01r 17/14
U.S. Cl. 235—179       2 Claims

ABSTRACT OF THE DISCLOSURE

A potentiometer reduces the voltage supplied to one terminal of a meter relay. The potentiometer is connected between ground and a contact stepped along a first voltage divider. The opposite terminal of the meter relay is connected to a contact stepped along a second voltage divider. One contact is stepped for each rejected sample; the other contact is stepped for each accepted sample. Adjustment of the potentiometer tap permits setting the device for different sequential sampling plans.

---

This application is a continuation of our copending application Ser. No. 739,908, filed June 14, 1968, which application was in turn a continuation of copending application Ser. No. 402,192, filed Oct. 7, 1964.

The present invention concerns an analyzer or computer which determines the relationship between two input variables in terms of electrical voltages and which determines when the observed relationship departs from a given preset relationship.

Occasions arise wherein it is desired to determine when the relationship between two quantities varies outside of a given range. As an example, certain quality control or inspection plans are used to maintain a given quality level with a minimum of actual inspection. A typical plan involves sequential sampling wherein individual units of a lot are inspected for conformity to given quality standards. It may be desired to reject the entire lot if the "reject" level is discovered by such sequential sampling to be too high, and to pass the lot if rejects are below a certain lower level.

The present invention is illustrated in such an environment, although the applications for the herein disclosed method and apparatus are not so limited.

Accordingly, a primary object of the invention is to provide an electrical analyzer for comparing two observed input variables with a predetermined relationship;

A further object is to provide an analyzer of the above character which determines when the observed relationship departs from the predetermined relationship;

A further object is to provide an analyzer wherein the predetermined relationship may be readily varied;

A further object is to provide an analyzer which is simple, reliable in operation and economical.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a more complete understanding of the nature and objects of the invention, reference should be made to the following detailed description taken in connection with the accompanying drawings, in which.

Figure 1:
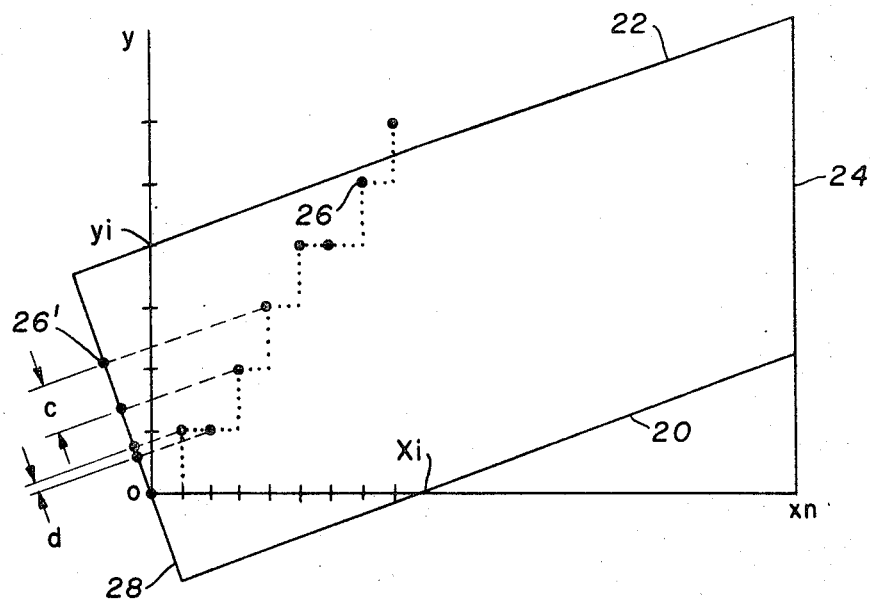
FIG. 1 is a graph illustrating the theory of the invention.

Referring now to FIG. 1, there is illustrated a graphic representation of a typical sequential sample quality control plan. As shown therein the X axis is laid out along the abscissa and the Y axis is laid out along the ordinate, the axes intersecting at the origin. A pair of parallel lines 20 and 22 are laid out on the graph with intercepts at "$Xi$" and "$Yi$." The X axis is laid off to a scale representing the number of units inspected, while the Y axis is laid off to a scale representing the number of unacceptable or rejected items. $X_n$ represents the total number of units in a given lot. A line 24 vertical to the X axis and intersecting the X axis at $X_n$ completes the graph. The slopes of lines 20 and 22, the intercepts $Xi$ and $Yi$, the value of $X_n$ and other characteristics are determined by well known statistical methods and procedures.

The use of the FIG. 1 chart may be demonstrated by the following considerations. Consider a point 26 starting at the origin and movable horizontally to the right in increments of X and movable vertical in increments of Y, as in the exemplary path shown in dotted lines. If a unit is inspected and found acceptable, the point 26 moves horizontally to the right one X unit. If a unit is inspected and rejected, the point moves horizontally to the right one X unit and vertically upward one Y unit. This is repeated for each unit inspected until the point reaches or crosses one of the lines 20, 22 or 24. The region below and to the right of line 20 may be considered as the "accept" region, the region above and to the left of line 22 is the "reject" region and the area between lines 20 and 22 is an area of "indecision." which requires further sampling before a decision is reached. If point 26 crosses line 22, the entire lot would be rejected without further inspection since the number of rejected units exceeds the number permitted by the graph. Conversely, if point 26 crosses line 20, the entire lot would be accepted without further sampling. As long as point 26 remains in the region between lines 20 and 22, sampling is continued; and if point 26 remains in the area of indecision until line 24 is reached, the lot will have been 100 percent inspected. Note that the area between lines 20 and 22 represents an area of indecision and determines the permissible range of variation permitted between accepted and rejected units before a decision is made to either reject or accept the entire lot.

While the FIG. 1 sampling plan could be administered with printed charts by physically plotting the movement of point 26 after each unit is sampled, such a procedure would be costly, time consuming and difficult, as well as susceptible to errors. The present invention provides for administering the sampling plan by feeding into a computer, signals corresponding to the accepted and rejected units, with the decision to accept, reject or continue sampling being made by the computer in accordance with the preselected plan.

Still referring to FIG. 1, a further line 28 may be constructed through the origin normal to lines 20 and 22. From each position of point 26, a projection 26' may be made to line 28 as shown by dashed lines which extend parallel to lines 20 and 22. This projection 26' moves along line 28 toward line 22 a distance $c$ each time point 26 moves to represent a rejected unit, and moves along line 28 away from line 22 a distance $d$ each time point 26 moves to represent an accepted unit. Thus the position of projection 26' with respect to the origin is determined by sequentially, algebraically adding negative $c$ units and positive $d$ units corresponding to the sequence of movement of point 26.

According to the present invention, apparatus is provided which includes an electrical analog of the position of projection 26' on the graph. In a particular embodiment, electrical voltage is incrementally added to and subtracted from a load circuit to correspond to the movement of projection 26'.

Figure 2:
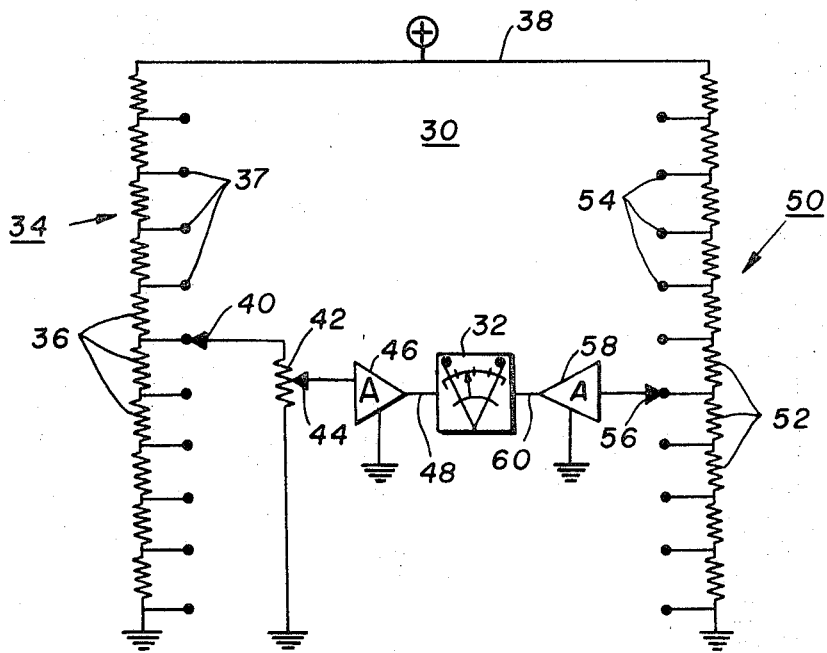
FIG. 2 is a simplified schematic circuit diagram of the system of the invention according to one aspect of the present invention.

FIG. 2 illustrates a simplified electrical bridge circuit 30 comprising impedances arranged as illustrated to form an electrical bridge wherein the voltage appearing across load impedance 32 is incrementally increased and decreased to correspond to the movement of projection 26'. Load 32 should be of the type which responds to either of two different conditions of bridge unbalance, such as two different voltages. For example, load 32 may be a meter relay.

Bridge 30 includes a first leg 34 composed of a series of identical resistors 36 connected in series between power supply conductor 38 and ground. The junctions between resistors 36 are connected to corresponding fixed contacts 37 of a first stepping switch, so that each upward movement of the movable contact 40 on the stepping switch increases the voltage on contact 40 by the same increment. A high-impedance voltage divider in the form of a potentiometer 42 is connected between contact 40 and ground, and includes a movable tap 44. The signal appearing on tap 44 is amplified by high input impedance amplifier 46 and supplied to output terminal 48.

The remaining leg 50 of bridge 30 is similarly composed of a series of identical resistors 52 connected in series between power supply conductor 38 and ground. The junctions between resistors 52 are connected to corresponding fixed contacts 54 of a second stepping switch, so that each upward movement of movable contact 56 thereon increases the voltage on movable contact 56 by a given increment, which is not necessarily identical with the increments appearing on contact 40. The signal appearing on movable contact 56 is amplified by amplifier 58 and supplied to the remaining output terminal 60.

Leg 34 thus constitutes a first signal source which produces on the first of its output terminals (contact 40) a signal voltage changing by equal increments as the first stepping switch is actuated. Similarly, leg 50 constitutes a second signal source which produces on the first of its output terminals (contact 56) a signal voltage changing by equal increments as the second stepping switch is actuated. The remaining or second output terminals of these signal sources are connected together, as by the illustrated ground connection.

The output signals on conductors 48 and 60 each increase in the same direction with respect to ground with additional actuations of their respective stepping switches; however, since they are applied to opposite meter terminals, (i.e., since these output signals are connected to oppose one another) the resulting voltage applied to meter 32 will correspond to the algebraic sum of the "accept" and the "reject" signals similar to the displacement of projection 26'.

It may be seen that if movable contact 40 is moved up one step for each "accept" item, an incremental voltage increase corresponding to $d$ will be applied to output terminal 48, and similarly each step of movable contact 56 will produce an opposing increment voltage increase on output terminal 60 corresponding to $c$ if the relative amplitudes of these incremental increases are properly selected. Adjustment of movable tap 44 on potentiometer 42 permits a simple adjustment of the amplitude of the $d$ signal applied to output terminal 48 as compared to the amplitude of the $c$ signal applied to output terminal 60.

Figure 3:
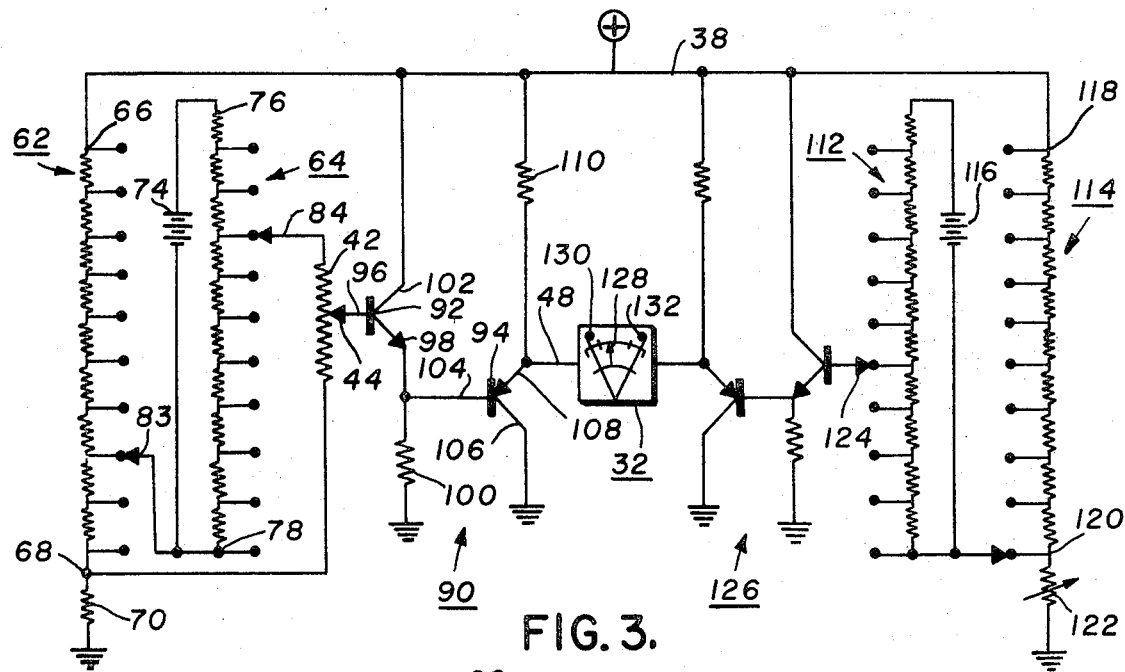
FIG. 3 is a schematic circuit diagram of the preferred embodiment of the invention.
Figure 4:
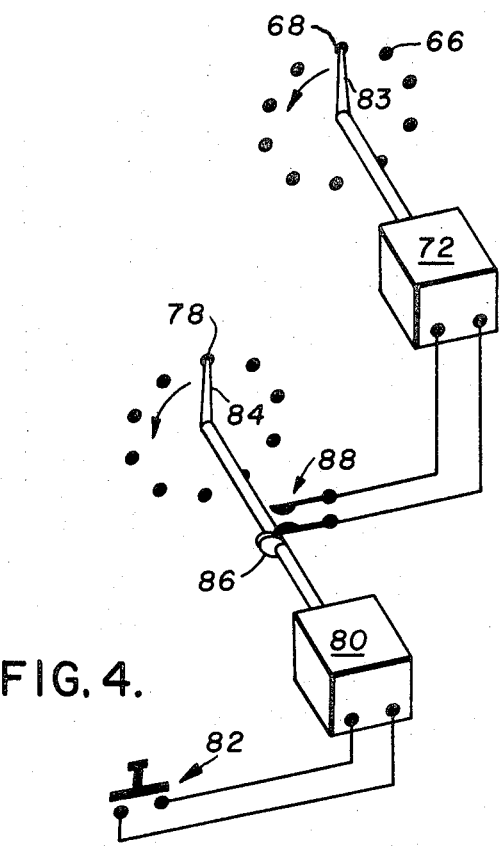
FIG. 4 is a schematic perspective view of the preferred stepping switch used in FIG. 3.

The preferred embodiment of the invention is illustrated in FIGS. 3 and 4, and includes various refinements over the simplified embodiment of FIG. 2 in order to increase the range of operation and permit increased linearity and accuracy.

In the preferred embodiment, leg 40 is replaced by a "tens" bank 62 of serially-connected identical resistors, and a "units" bank 64 of serially-connected identical resistors. Banks 62 and 64 are connected together in a cascade relationship. One end terminal 66 of bank 64 is connected to supply conductor 38, and the other end terminal 68 is connected through resistor 70 to ground. End terminals 66 and 68 and the junctions between the resistors in bank 62 are connected to corresponding fixed contacts on stepping switch 72 (FIG. 4).

A floating power supply 74 has its positive terminal connected to end terminal 76 of the "units" bank 64, and its negative terminal connected to the opposite end terminal 78. A series of identical serially-connected resistors are connected between end terminals 76 and 78 to form bank 64. End terminal 78 and the intermediate junctions between the several resistors of bank 64 are connected to the corresponding terminals on "units" stepping switch 80 (FIG. 4), which may be actuated by an "accept" switch 82.

The movable contact 83 of stepping switch 72 is directly connected to the negative terminal of power supply 74 and the movable contact 84 of stepping switch 80 is connected to the upper end of potentiometer 42. The lower end of potentiometer 42 is returned to terminal 68.

As illustrated in FIG. 4, stepping switch 80 is provided with a cam 86 which momentarily closes a pair of contacts 88 as movable contact 84 steps from contact 76 to contact 78. Closure of contacts 88 actuates the solenoid of stepping switch 72, stepping its movable contact 83 to the next higher position as viewed in FIG. 3 (the next counterclockwise position as viewed in FIG. 4).

The component values and the power supply voltages are selected so that the voltage drop across each resistor in bank 62 is exactly equal to the total voltage of floating power supply 74.

Banks 62 and 64 with their stepping switches 72 and 80, together with sources 38 and 74, constitute a cascaded (specifically decaded) power supply variable in steps of equal increments. Thus the voltage supplied to potentiometer 42 will continue to increase by the same increment for each actuation of "accept" manual push button 82 over a much greater range than could be accommodated by stepping switch 80. A fraction of the signal applied to potentiometer 42 is applied by movable tap 44 to the input of a stable, linear, high-input impedance amplifier 90.

Amplifier 90 includes an NPN emitter follower stage 92 cascaded with a PNP emitter follower stage 94. Thus stage 92 includes a base 96 connected to tap 44 and an emitter 98 connected through a load resistor 100 to ground. Collector 102 of stage 92 is connected to conductor 38. Stage 94 includes base 104 directly connected to emitter 98 and collector 106 connected to ground. Emitter electrode 108 of stage 94 is connected to output terminal 48 and through load resistor 110 to conductor 38.

This particular amplifier 90 provides great stability with temperature changes, and excellent linearity over a wide range of voltages applied to base 96.

Leg 50 in FIG. 2 is similarly replaced by decaded banks of resistors 112 and 114, together with a second floating power supply 116. Bank 114 has end terminal 118 connected to power supply terminal 38 and end terminal 120 connected through variable resistor 122 to ground. The resistors and connections in and between banks 112 and 114, the "reject" manual switch, and the stepping switches connected therewith may be identical to those described above with respect to banks 62 and 64, except that the movable contact 124 is connected directly to amplifier 126 rather than through a potentiometer to the amplifier. Amplifier 126 preferably is identical to amplifier 90.

In the FIG. 3 embodiment, resistors 70 and 122 provide a small initial forward bias for the input stages of amplifiers 90 and 126, respectively. Resistor 122 may be variable as illustrated to permit balancing of the needle 128 of meter 32 at the zero position when the instrument is in the reset position. This zero or balanced condition of load 32 corresponds to the origin in the FIG. 1 graph, while the different degrees of unbalance to which load 32 responds correspond to the lines 20 and 22 in FIG. 1. If the load 32 is a meter relay as illustrated, adjustable contacts 130 and 132 correspond to lines 20 and 22, respectively, while the position of needle 128 represents the position of projection 26'. As noted above, adjustment of tap 44 permits adjustment of the amplitude of the "accept" increments ($d$) relative to the amplitude of the "reject" increments ($c$). Thus tap 44 should be so adjusted so that the voltage increment produced on tap 44 for each step in bank 64 has the same relationship to the voltage increment on contact 124 for each step in bank 116 as distance $d$ has to distance $c$.

The following specific example of the preferred embodiment is given to illustrate exemplary values:

Resistors in banks 62 and 114—100 ohms
Resistors in banks 64 and 116—10 ohms
Potentiometer 42—40 kilohms
Resistor 70—120 ohms
Resistor 100—10 kilohms
Resistor 110—2700 ohms
Source 38—20.4 volts
Source 74—2.0 volts
Transistor 92—Texas Inst. type TI-495
Transistor 94—Type 2N2904

With the apparatus adjusted as described above to correspond to a desired sampling plan, such as the one illustrated in FIG. 1, needle 128 will indicate the position of projection 26' on line 28, and will engage contact 130 or contact 132 when the area of indecision is left by projection 26'. It should be understood that individual indicator or control apparatus may be connected to each of contacts 130 and 132, or that these contacts may be connected to a common output apparatus if desired.

While the invention has been disclosed for the sake of simplicity as including resistors in a voltage divider arrangement across a DC source, other impedances may be used in a similar arrangement with either an AC or a DC source. AC may be used if the load 32 is selected to respond to the phase of the voltage across terminals 48 and 60 as well as to the amplitudes corresponding to lines 20 and 22. In addition, the banks of impedances across a source may be replaced with tapped transformer secondary windings, which may be decaded if desired, when using a phase-responsive load. With a sufficiently sensitive load 32, the amplifiers may be dispensed with in any case. The instrument may respond to automatic rather than manual actuation of the stepping switches. Also, the instrument may be arranged to incrementally decrease the voltages on contacts 84 and 124, rather than to increase these voltages, if desired.

Various specific cascading or decading arrangements may be used other than the one illustrated. Thus the upper resistor in bank 64 may be eliminated if the voltage across each resistor in bank 62 equals 1⅒ times the voltage of source 74. Other modifications will occur to those skilled in the art.

Accordingly there has been disclosed in the above specification and the accompanying drawings an analyzer which determines the relationship between two input variables in terms of voltages and which determines when the observed relationship departs from a given preset relationship. In the preferred embodiment, the output signal comprises two opposing components, each of which is increased in accordance with its respective input variable. Advantageously the total variation in voltage is determined by an electrical bridge arrangement. The disclosed apparatus permits ready adjustment in order to conform with a desired inspection plan, by appropriate adjustment of the contact 130 and 132 on meter relay 32 and of the several impedances as above described. The disclosed apparatus is simple, reliable in operation and economical.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. An analyzer comprising in combination:
   (a) first and second signal sources, each of said sources having a first and second output terminal, said first ouput terminals having a given polarity with respect to said second output terminals;
   (b) means for connecting said second output terminals;
   (c) a potentiometer connected between said first and said second output terminals of said first source, said potentiometer having a variable intermediate tap;
   (d) first control means for changing in a given direction the voltage at said first output terminal of said first source by a first given increment in response to each occurrence of a first signal;
   (e) second control means for changing in said given direction the voltage at said first output terminal of said second source by a given increment in response to each occurrence of a second signal;
   (f) load means responsive to the variations in the value of the applied voltage beyond selected pre-set limits;
   (g) means connecting said load means between said potentiometer tap and said first output terminal of said second signal source.

2. The analyzer defined in claim 1, wherein:
   (a) said first and second signal sources include first and second respective voltage dividers, each of said voltage dividers including a plurality of taps spaced therealong at equal voltage intervals;
   (b) said first output terminal of said first voltage divider including a contact for sequentially engaging said taps on said first voltage divider;
   (c) said first output terminal of said second voltage divider including a second contact for sequentially engaging said taps on said second voltage divider;
   (d) said first control means including means for stepping said first contact sequentially along said taps on said first voltage divider;
   (e) said second control means including means for stepping said second contact sequentially along said taps on said second voltage divider.

References Cited

UNITED STATES PATENTS

| | | | |
|---|---|---|---|
| 2,497,961 | 2/1950 | Shaw | 340—347 |
| 2,938,669 | 5/1960 | Henry | 235—179 |
| 2,940,071 | 6/1960 | Kindred | 340—347 |

MALCOLM A. MORRISON, Primary Examiner

F. D. GRUBER, Assistant Examiner

U.S. Cl. X.R.

235—92, 193; 323—75